(12) United States Patent
Okuda et al.

(10) Patent No.: US 6,802,207 B2
(45) Date of Patent: Oct. 12, 2004

(54) ROTATIONAL DRIVING APPARATUS FOR TESTING INTERNAL COMBUSTION ENGINE

(75) Inventors: Yoshifumi Okuda, Shiga-ken (JP); Yahiko Iwasaki, Shiga-ken (JP)

(73) Assignee: Daifuku Co., Ltd., Osaka (JP)

( * ) Notice: Subject to any disclaimer, the term of this patent is extended or adjusted under 35 U.S.C. 154(b) by 37 days.

(21) Appl. No.: 10/377,220

(22) Filed: Feb. 28, 2003

(65) Prior Publication Data

US 2003/0164029 A1 Sep. 4, 2003

(30) Foreign Application Priority Data

Mar. 4, 2002 (JP) ......................................... 2002-057228

(51) Int. Cl.⁷ .............................................. G01N 15/00
(52) U.S. Cl. ......................................... 73/116; 73/118.1
(58) Field of Search .............................. 73/116, 117.2, 73/117.3, 118.1, 119 R; 340/438, 439, 441; 701/29

(56) References Cited

U.S. PATENT DOCUMENTS

| | | | | |
|---|---|---|---|---|
| 4,331,029 A | * | 5/1982 | Wilson ........................ 73/117.3 |
| 5,085,071 A | * | 2/1992 | Mizushina et al. ......... 73/118.1 |
| 5,142,903 A | * | 9/1992 | Mizushina et al. ......... 73/118.1 |
| 5,417,109 A | * | 5/1995 | Scourtes ....................... 73/116 |
| 5,515,712 A | * | 5/1996 | Yunick ............................. 73/9 |
| 5,537,865 A | * | 7/1996 | Shultz ......................... 73/118.1 |
| 6,047,596 A | * | 4/2000 | Krug et al. .................... 73/162 |
| 6,343,504 B1 | * | 2/2002 | Shultz ......................... 73/118.1 |
| 6,405,585 B1 | * | 6/2002 | Hewitt .......................... 73/116 |
| 2003/0094053 A1 | * | 5/2003 | Anderson .............. 73/862.323 |

FOREIGN PATENT DOCUMENTS

JP          02-13732 A       5/1984

* cited by examiner

*Primary Examiner*—Eric S. McCall
(74) *Attorney, Agent, or Firm*—Webb Ziesenheim Logsdon Orkin & Hanson, P.C.

(57) ABSTRACT

The invention discloses a rotational driving apparatus for cold testing an internal combustion engine to which a ring gear is attached. The rotational driving apparatus has a rotor that is rotatively driven about the rotation axis of the ring gear of an internal combustion engine that is in the testing position. A pivot arm is supported rotatably with respect to the rotor via a link pin. The front end portion of the pivot arm is provided with an engaging portion that can engage the ring gear through shifting to the inward side with respect to the radial direction. The pivot arm also has a portion that extends rearward of the link pin. When the rotor is rotated, this portion extending to the rear generates a torque in the direction in which the engaging portion is shifted so as to engage the ring gear. A link that extends at an angle that is nearly perpendicular to the rotation axis is joined to the rear end of the pivot arm. The other end of the link is joined to a reciprocating member that is shifted in the direction along the rotation axis by an actuator.

16 Claims, 9 Drawing Sheets

ROTATIONAL DRIVING APPARATUS FOR TESTING INTERNAL COMBUSTION ENGINE

BACKGROUND OF THE INVENTION

The present invention relates to rotational driving apparatuses for testing internal combustion engines to which a ring gear is attached.

Rotational driving apparatuses for testing internal combustion engines are used to test an internal combustion engine under test by rotating the internal combustion engine without igniting it, that is, they are used when performing so-called 'cold testing'. Cold testing includes valve-related testing, such as the timing at which the intake value and the exhaust valve open and close, and testing of the injection nozzle.

An example of such a rotational driving apparatus for an internal combustion engine is disclosed in JP 10-115576A (hereinafter referred to as "first conventional example"). The first conventional example is illustrated in FIG. 8. A ring gear 143 is mounted to a crank shaft 141, which is the primary shaft of an internal combustion engine 140 that is in the testing position. A rotor 103 is provided as a part of the rotational driving apparatus, and is rotatively driven about the rotation axis of the ring gear 143 (hereinafter, referred to as the "ring gear rotation axis"). An engaging member 130 is provided on the rotor 103 and is slidable in the radial direction of the ring gear 143 (hereinafter, referred to as the "ring gear radial direction"). The engaging member 130 can engage with the ring gear 143 by shifting inwardly in the radial direction. A switching means 110 is provided to shift the engaging member 130 in the ring gear radial direction so as to switch it between an engaged position in which the engaging member 130 engages with the ring gear 143 and a released position in which the engaging member is disengaged. The rotational driving apparatus can rotate the ring gear 143 by rotating the rotor 103 while the engaging member 130 is engaged with the ring gear 143.

The base end of the engaging member 130 is supported only by the rotor 103, and its front end portion is provided with an engaging portion 136 that engages the ring gear 143.

The switching means 110 is provided with a cylindrical body 106 that is fitted, shiftably in the axial direction, to the outside of an output shaft 101 that is rotatively driven about the axis of the rotor 103, that is, about the ring gear rotation axis, and an L-shaped linkage 127 that is pivotably supported on the rotor 103 and that shifts the engaging member 130 in the ring gear radial direction by pivoting. An end portion of the L-shaped linkage 127 engages a groove provided in the circumferential surface of the cylindrical body 106 so that the L-shaped linkage 127 is pivoted as the cylindrical body 106 is shifted in the ring gear rotation axis direction. In FIG. 8, the reference numeral 102 denotes an electric motor that rotatively drives the output shaft 101, and 107 denotes a cylinder with which the cylindrical body 106 can be shifted in the ring gear rotation axis direction.

Also, the rotor 103 is supported rotatively with respect to a frame 111 via bearings 112. The rotor 103 and the cylindrical body 106 are free to move relative to one another in the ring gear rotation axis direction and are connected via a key so that they rotate as a single unit. The cylindrical body 106 is linked to the output shaft 101 so that the two rotate as a single unit.

In other words, in the first conventional example, the L-shaped linkage 127 is pivoted due to the cylinder 107 shifting the cylindrical body 106 in the ring gear rotation axis direction. And through this pivoting, the engaging member 130 is slidably shifted in the ring gear radial direction, switching between the engaged position and the released position.

Another conventional example of a rotational driving apparatus is disclosed in JP H02-13732A (hereinafter referred to as "second conventional example"). FIG. 9 shows the second conventional example. In FIG. 9, a ring gear 225 is mounted to a primary shaft (crank shaft) 213 of an internal combustion engine (not shown) in the testing position. This rotational driving apparatus is provided with a shaft-shaped rotor 228 that is rotatively driven about the rotation axis of the ring gear 225 (hereinafter, referred to as the "ring gear rotation axis"). It is also provided with an engaging member 236 that is pivotably supported on the rotor 228 so that it can be shifted in the radial direction of the ring gear 225 (hereinafter referred to as the ring gear radial direction"), and that can engage the ring gear 225 by shifting inward with respect to the radial direction. The rotational driving apparatus is also provided with a switching means 240 that shifts the engaging member 236 in the ring gear radial direction so that it is switched between an engaged position in which it engages the ring gear 225, and a released position in which it is disengaged. The ring gear 225 can be rotated by rotating the rotor 228 with the engaging member 236 engaged with the ring gear 225.

A base end of the engaging member 236 on the inward side with respect to the ring gear radial direction is pivotably supported on the rotor 228, and the front end of the engaging member 236 on the outward side with respect to the ring gear radial direction forms an L-shape that is bent towards the ring gear 225 direction along the ring gear rotation axis direction. An engaging portion 239 that engages the ring gear 225 is provided at the front end of the engaging member 236.

The switching means 240 is provided with a cylindrical body 232 that is fitted to the outside of the rotor 228 such that it can be shifted in the axial direction, that is, in the ring gear rotation axis direction, and a disk-shaped rotating member 234 that is rotatable relative to the cylindrical body 232 via bearings and that is mounted in an outside fitting state such that it is shiftable in the ring gear rotation axis direction. The fore end portion of the rotating member 234 is pivotably linked to an intermediate portion of the engaging member 236 via link pins 235. By shifting the cylindrical body 232 in the ring gear rotation axis direction, the engaging member 236 is switched between the engaged position and the released position.

In FIG. 9 the reference numeral 212 denotes an electric motor that rotatively drives the rotor 228, and 244 denotes a cylinder with which the cylindrical body 232 can be shifted in the ring gear rotation axis direction and that is operatively connected to the cylindrical body 232 via a pivot link 242, which pivots about a pivot shaft 241.

In other words, according to the second conventional example, the engaging member 236 is pivoted in the ring gear radial direction due to the cylinder 244 shifting the cylindrical body 232 in the ring gear rotation axis direction, switching the engaging member 236 between the engaged position and the released position.

Conventionally, an internal combustion engine was tested by running the internal combustion engine at low speeds of about 1200 rpms, for example. However, in order to achieve complete test results and increase the testing accuracy, for example, it is desirable to test the internal combustion engine also at high speeds, such as at 4000 rpms.

In the first conventional example mentioned above, when the internal combustion engine is run at high speeds, the large centrifugal force causes the engaging member, which is supported with respect to the rotor such that it can be slideably shifted in the ring gear radial direction, to shift outward with respect to ring gear radial direction. In order to counter this large centrifugal force and hold the engaging member in the engaged position, it is necessary to increase the control force of the cylinder so that there is a sufficiently large enough control force keeping the engaging member inward in the ring gear radial direction. However, increasing the control force for keeping the engaging member inward in the ring gear radial direction not only makes the structure of the apparatus complex but may also damage the ring gear due to the strong force at which the ring gear is pushed inward in the radial direction by the engaging member in a stopped state, in which the ring gear is not rotated, and in a low-speed rotation state, in which the ring gear is rotated at a low speed. Thus, the configuration of the first conventional example was not suited for running an internal combustion engine at high speeds.

Moreover, also in the second conventional example mentioned above, when the internal combustion engine is run at high speeds, the large centrifugal force causes the engaging member, which is supported with respect to the rotor such that it is pivotable in the ring gear radial direction, to move outward in ring gear radial direction. In order to counter this large centrifugal force and hold the engaging member in the engaged position, as in the first conventional example, it is necessary to increase the control force of the cylinder so that there is a sufficiently large enough control force to keep the engaging member inward in the ring gear radial direction. The result was that the configuration of the second conventional example, like the configuration of the first conventional example, was not suited for running an internal combustion engine at high speeds.

Consequently, there is a need for rotational driving apparatuses for testing internal combustion engines whose structure is suited for testing internal combustion engines at high speeds as well as at lower speeds.

SUMMARY OF THE INVENTION

The present invention was arrived at in light of the foregoing problems, and it is an object thereof to provide a rotational driving apparatus for testing an internal combustion engine with which the internal combustion engine can be rotated at high speeds as well as at lower speeds.

A rotational driving apparatus according to the present invention has a rotor that is rotatively driven about a rotation axis of the ring gear, and a pivot portion supported in a support position with respect to the rotor. The support position is located substantially away from a front end and a rear end of the pivot portion in the direction of the rotation axis of the ring gear. An engaging portion is provided at the front end region of the pivot portion with respect to the ring gear. Consequently, when the rotor is rotated, a torque in the direction in which the engaging portion is caused to engage the ring gear is generated by a portion between the support position and the rear end of the pivot portion. This torque cancels out at least a portion of a torque generated at a portion on the front end side of the pivot portion. Consequently, the control force that is required to displace the engaging portion is reduced, even if the rotor is rotated at high speeds.

In an embodiment of the present invention, a link that is operatively connected to the pivot portion directly or indirectly is employed so as to manipulate the engaging portion between an engaged position in which it engages the ring gear and a non-engaged position. This link is also joined to a reciprocating member that is shifted in the direction of the rotation axis by an actuator. The angle that is formed between the link and the rotation axis is preferably large. Thus, the horizontal component of the total torque generated by the centrifugal force that acts on the pivot portion is reduced before being transmitted to the reciprocating member, and thus the effects, when running at high speeds, of the centrifugal force on the control force for engaging the engaging portion with the ring gear can be further reduced.

The following description of the embodiments according to the present invention made with reference to the drawings is provided for illustration only, and not for the purpose of limiting the invention, which is defined by the claims.

DETAILED DESCRIPTION OF THE INVENTION

Hereinafter, preferred embodiments of the present invention are described with reference to the drawings.

Figure 2A:
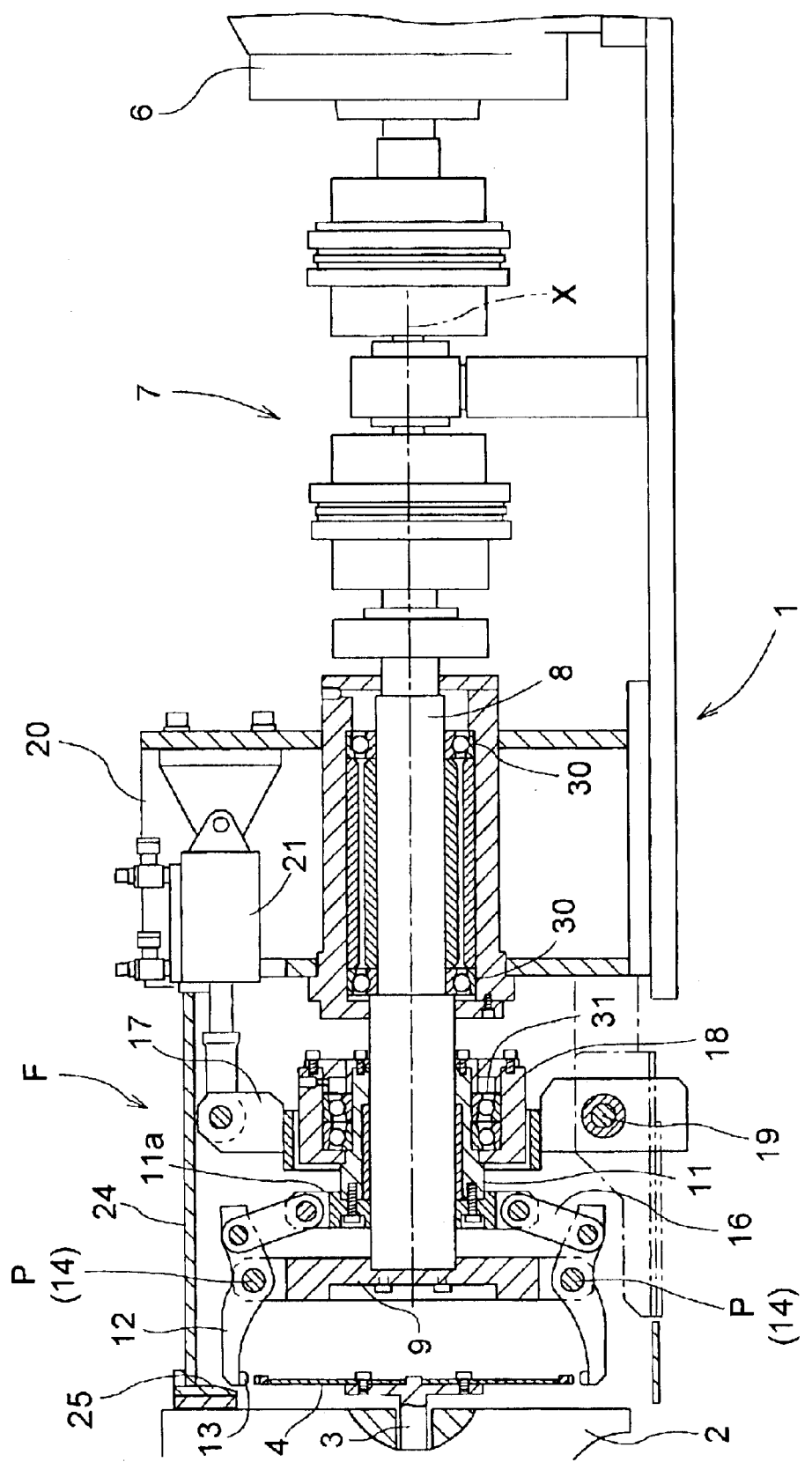
FIG. 2 is a vertical cross-sectional lateral view showing a cross section of a portion of the rotational driving apparatus for testing an internal combustion engine according to the present invention as shown in FIG. 1.

FIG. 2A shows a primary shaft (crank shaft) 3 of an internal combustion engine 2 to be tested, and a ring gear 4 that rotates as a single unit with the primary shaft 3. A driving apparatus for internal combustion engine testing tests the internal combustion engine 2 by rotatively driving the ring gear 4 using an electric motor 6. In the present application, the direction to the left in FIG. 2A is defined as the forward direction, and conversely, the direction to the right (where of the electric motor 6 is) is defined as the rear direction.

Figure 1:
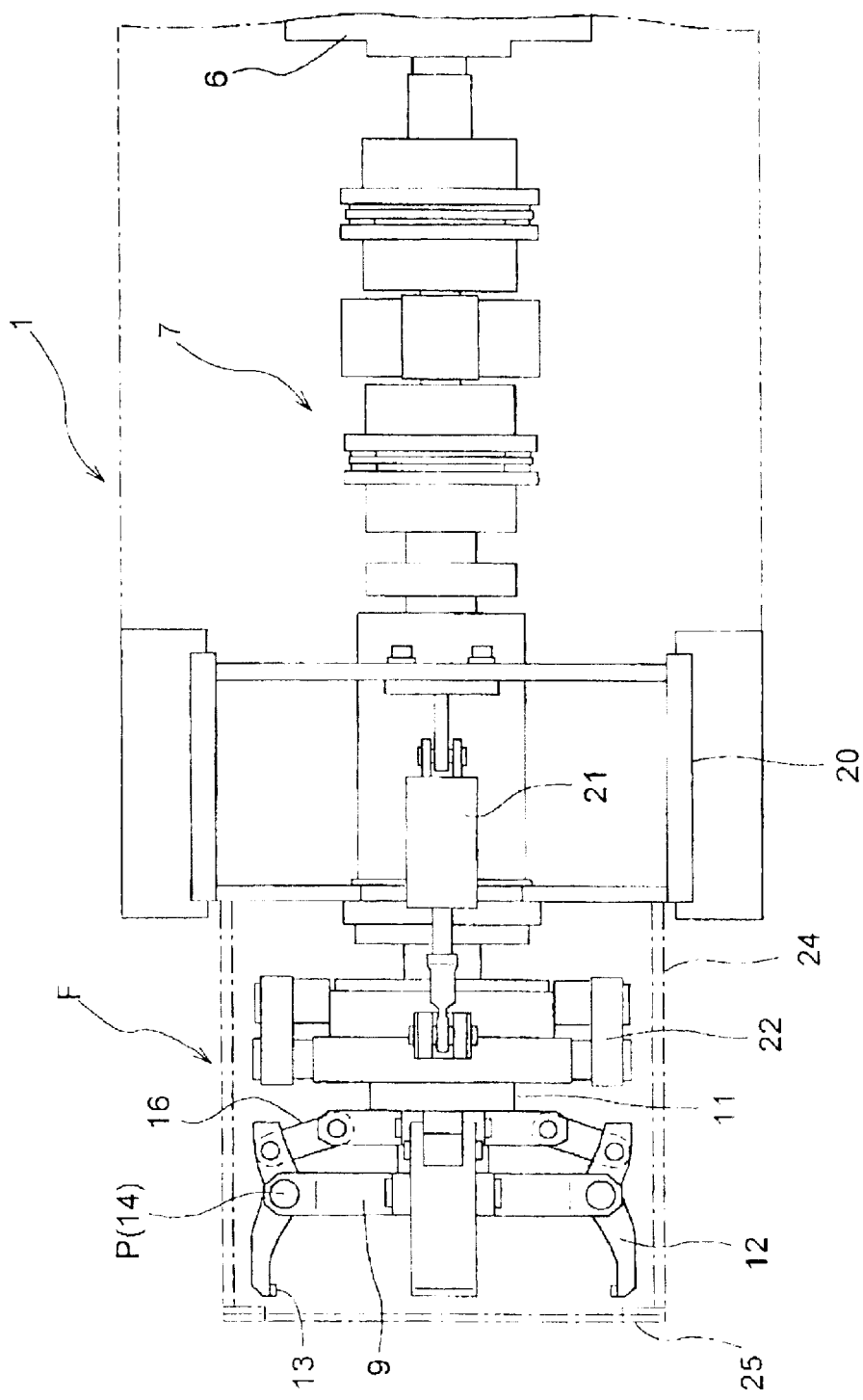
FIG. 1 is a plan view that schematically shows a rotational driving apparatus for testing an internal combustion engine according to the invention.

As shown in FIGS. 1 and 2A, the driving apparatus is provided with a triangular plate-shaped rotor 9 (see FIG. 3) that is rotatively driven about the rotation axis of the ring gear 4 (hereinafter, referred to as the "rotation axis X"), pivot arms 12, which are examples of pivot portions, that are supported by the rotor 9 so that they are shiftable in the radial direction of the ring gear 4 (hereinafter, referred to as "ring gear radial direction") and that can engage with the ring gear 4 by shifting inward in the ring gear radial direction, and a switching mechanism F that shifts the pivot arms 12 in the ring gear radial direction so as to switch them between an engaged position in which they engage the ring gear 4 and a released position in which they are disengaged therefrom. The internal combustion engine 2 can be rotatively driven by setting the relative positions between the internal combustion engine 2 and the rotational driving apparatus while the pivot arms 12 are in the released position and then shifting the pivot arms 12 into the engaged position and rotatively driving the rotor 9. When testing is over, the pivot arms 12 are switched into the released position so as to shift the internal combustion engine 2 from the testing position.

Hereinafter, the components of the apparatus are described in detail.

As shown in FIG. 2A, the electric motor 6 is mounted to an upper portion of a frame 1 and a support frame 20 is provided on the frame 1, extending upward.

An output shaft 8 is rotatively supported by the support frame 20 via bearings 30 such that it is coaxial with the rotation axis X. The output shaft 8 and the electric motor 6 are operatively connected via a link portion 7 so that they rotate as a single unit. Also, near the internal combustion engine side end of the output shaft 8, the rotor 9 is attached to the support frame 20 in a state fastened by bolts so that it rotates as a single unit with the output shaft 8. With this configuration, the rotor 9 is rotatively driven by the electric motor 6.

Figure 2B:
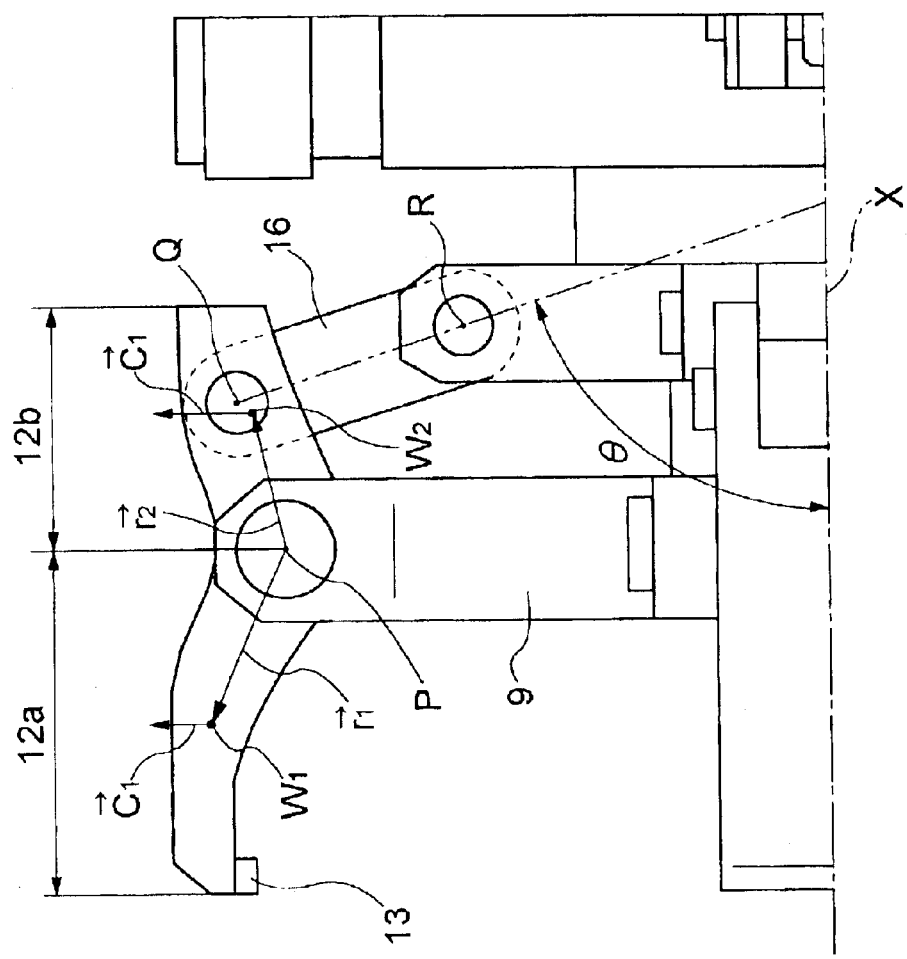

The pivot arms 12 are each provided with an engaging portion 13, which engages the ring gear 4, at or near an end portion thereof (called the front end) on the internal combustion engine side in the rotation axis X direction. The pivot arms 12 are pivoted at an outer circumference portion of the rotor 9 via link pins 14, at a position that is displaced from the engaging portion 13 in the rotation axis X direction. The pivot arms 12 can be pivoted about a fulcrum P, which is the center of the link pins 14, and as a result the engaging portions 13 can be shifted in the radial direction of the ring gear 4. That is, as shown in FIG. 2B, the pivot arms 12 are each provided with a first portion 12a, which extends from the fulcrum P in the rotation axis X direction to the tip of the portion with the engaging member 13, and a second portion 12b that extends from the fulcrum P to the rear end of the pivot arm 12 (the end on the opposite side to the front end with respect to the fulcrum P). In other words, the fulcrum P is between the front end and the rear end of the pivot arms 12, and is located substantially away from the front and rear ends. The fulcrum P is preferably located near the center point of the pivot arms 12 in the rotation axis X direction. The pivot arms 12 are members serving as an example of a pivot portion, however, although the term "arm" is used here because the pivot portion has a component that extends in the rotation axis X direction, this language is not to be construed as limiting the pivoting portion to a specific shape.

In a preferred embodiment, the first portion 12a weighs slightly less than the second portion 12b with respect to the fulcrum P. Accordingly, the centrifugal force at the time of rotative driving predisposes the pivot arm 12 to move toward the side at which it engages the ring gear 4. Put differently, the torque of the first portion 12a with respect to the fulcrum P, which is generated as a result of the centrifugal force when the rotor 9 is rotated, is set smaller than the torque of the second portion 12b. When the difference between the torque of the first portion 12a and the torque of the second portion 12b (in other words, the total torque) is large, the force that is transmitted to the switching mechanism F is accordingly increased. Consequently, it is preferable that the total torque is small. For example, it is preferable that the value of the total torque divided by the torque of the first portion 12a is not more than 0.7, more preferably not more than 0.5, and even more preferably not more than 0.3. (When calculating the torque of the second portion 12b, the link pin for the link member 16 in the fulcrum Q is included, but the torque applied by the link member 16 is not included).

As shown in FIG. 2B, the torque of the first portion 12a is given by the cross product of a position vector r1 from the fulcrum P to the center of gravity W1 of the first portion 12a and the vector of the centrifugal force C1 acting on that center of gravity. Likewise, the torque of the second portion 12b is the cross product of a position vector r2 from the fulcrum P to the center of gravity W2 of the second portion 12b and the vector of the centrifugal force C2 acting on that center of gravity. The centrifugal force of an object is given by the product of its mass, the distance between its location (i.e. center of gravity in the present case) from the rotation center, and a squared value of the angular velocity. The angular velocity is the same for the first portion 12a and the second portion 12b. Consequently, the torque that is applied to the first portion 12a and the second portion 12b of the pivot arm 12 can be adjusted by changing variables other than the angular velocity, that is, by changing the mass of each portion, the location of the center of gravity of each portion with respect to the fulcrum P, the cross product of each location vector and the corresponding centrifugal force, and the distance from the rotation axis X to the center of gravity of each portion, or by adjusting the combination of these variables. Through this adjustment, the engaging portion 13 can be predisposed to move in the direction in which it engages with the ring gear 4 due to the centrifugal force at the time of rotative driving. However, it is to be understood that the present preferred embodiment is an illustrative example of the invention, which contemplates a configuration of the pivot portion in which the torque due to the second portion 12b cancels out at least a portion of a torque generated by the first portion 12a, resulting in a better-balanced pivot portion about the fulcrum P.

Figure 3:
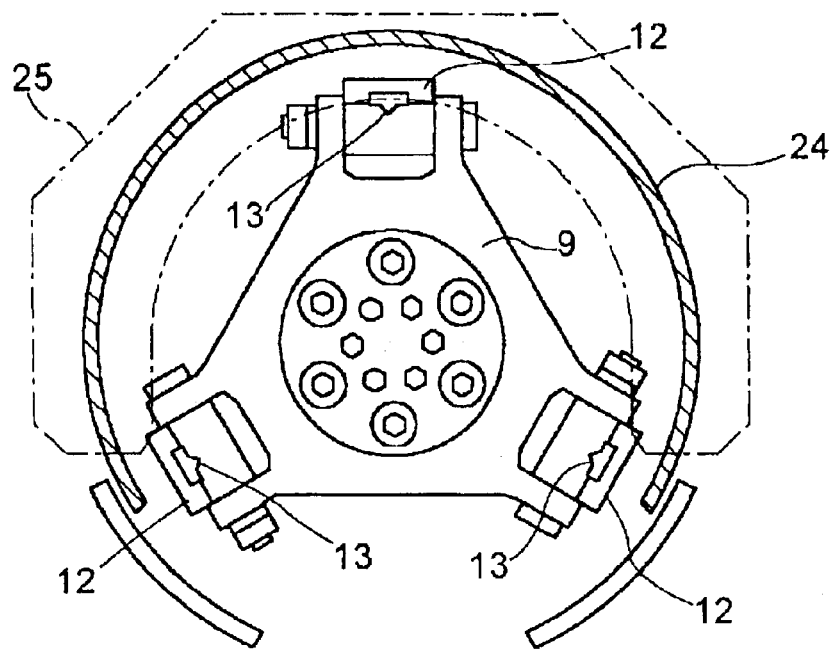
FIG. 3 is a front view showing the mount portion of the engaging member.

It should be noted that in the present embodiment, three pivot arms 12 have been provided with a space between them in the circumferential direction, as shown in FIG. 3.

As is best shown in FIG. 2A, the switching mechanism F is provided with a reciprocating member 11 that is supported such that is can move back and forth in the rotation axis X direction, and link members 16, one end of which is pivoted at the rear end portion of the pivot arms 12 and the other end of which is pivoted at the reciprocating member 11 via link pins. As shown in FIG. 2B, the link members 16 extend so that a large angle is formed between them and the rotation axis X. By making the angle formed between the link members 16 and the rotation axis X large, the total torque that is generated as the result of the centrifugal force applied to the pivot arms 12 when the driving apparatus is rotating has a smaller component in the shift direction of the reciprocating member 11 (rotation axis X direction). The component in the shift direction of the reciprocating member 11 (rotation axis X direction) of the total torque can also be reduced by shifting the fulcrum Q, shown in FIG. 2B, away from the fulcrum P in the rotation axis X direction.

As shown in FIG. 2B, the angle formed by the link members 16 is defined as the angle θ between the rotation axis X and the straight line that passes through the axes Q and R of the link pins that are located at the end portions of the link members 16. This angle θ is largest when the engaging member 13 of the pivot arms 12 is in the position where it engages the ring gear 4, and is preferably between 70° and 95° and more preferably between 75° and 85°. Also, the smallest angle formed by the link members 16 and the rotation axis X is preferably set between 45° and 70° and more preferably between 50° and 60°. Therefore, the angle formed by the link members 16 can take on a value between one of the values of the minimum angle and one of the values of the maximum angle.

The switching mechanism F switches the pivot arms 12 between the engaged position (see FIG. 6) and the released position (see FIG. 7) by shifting the reciprocating member 11 in the rotation axis X direction.

To describe in more detail, as shown in FIG. 2A, the reciprocating member 11 is a cylinder that is fitted to the outside of the output shaft 8 such that it can shift back and forth in the rotation axis X direction. Also, a link frame 11a provided with brackets for pivoting the link members 16 is fastened by bolts to the front end portion of the reciprocating member 11 on the internal combustion engine side.

Figure 4:
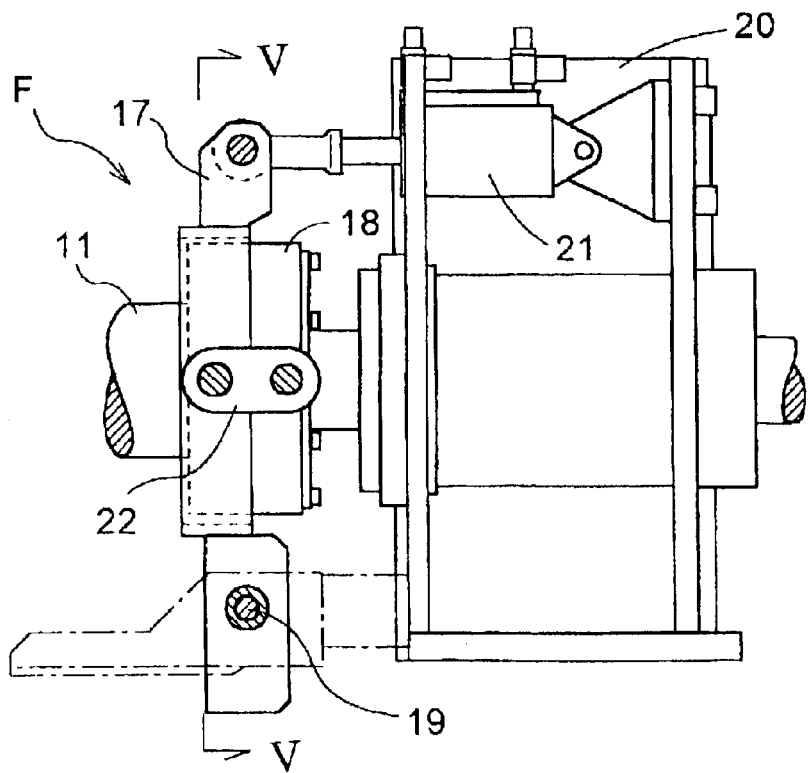
FIG. 4 is a lateral view showing the mount portion of the pivot arms.
Figure 5:
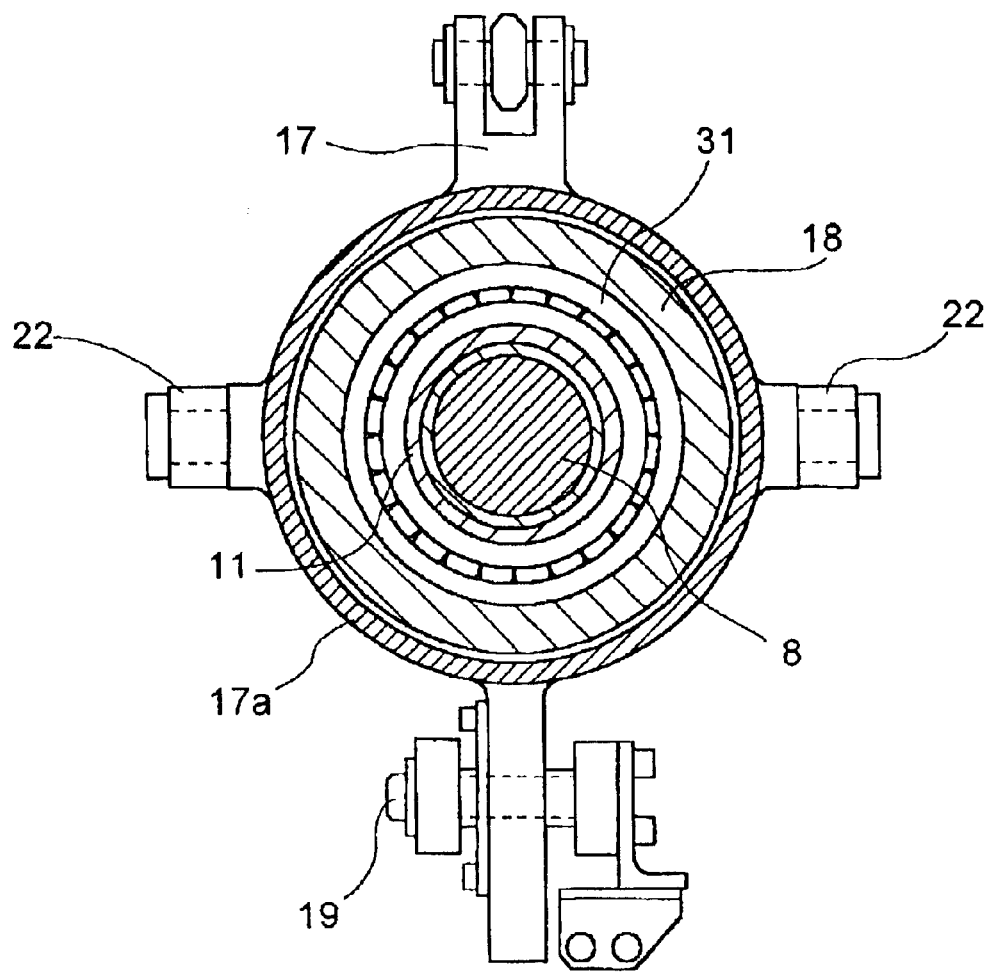
FIG. 5 is a cross-sectional view taken along the line V—V in FIG. 4.

As shown in FIGS. 4 and 5, a linking cylinder 18 is mounted to the outer circumference of the reciprocating member 11 such that it can rotate relative to the reciprocating member 11 via a bearing 31 and such that the two can move in the axial direction as a single unit. Moreover, a pivot bracket 17, which can pivot about a transverse shaft 19 whose center axis extends in a direction perpendicular to the rotation axis X, is also provided.

Figure 6:
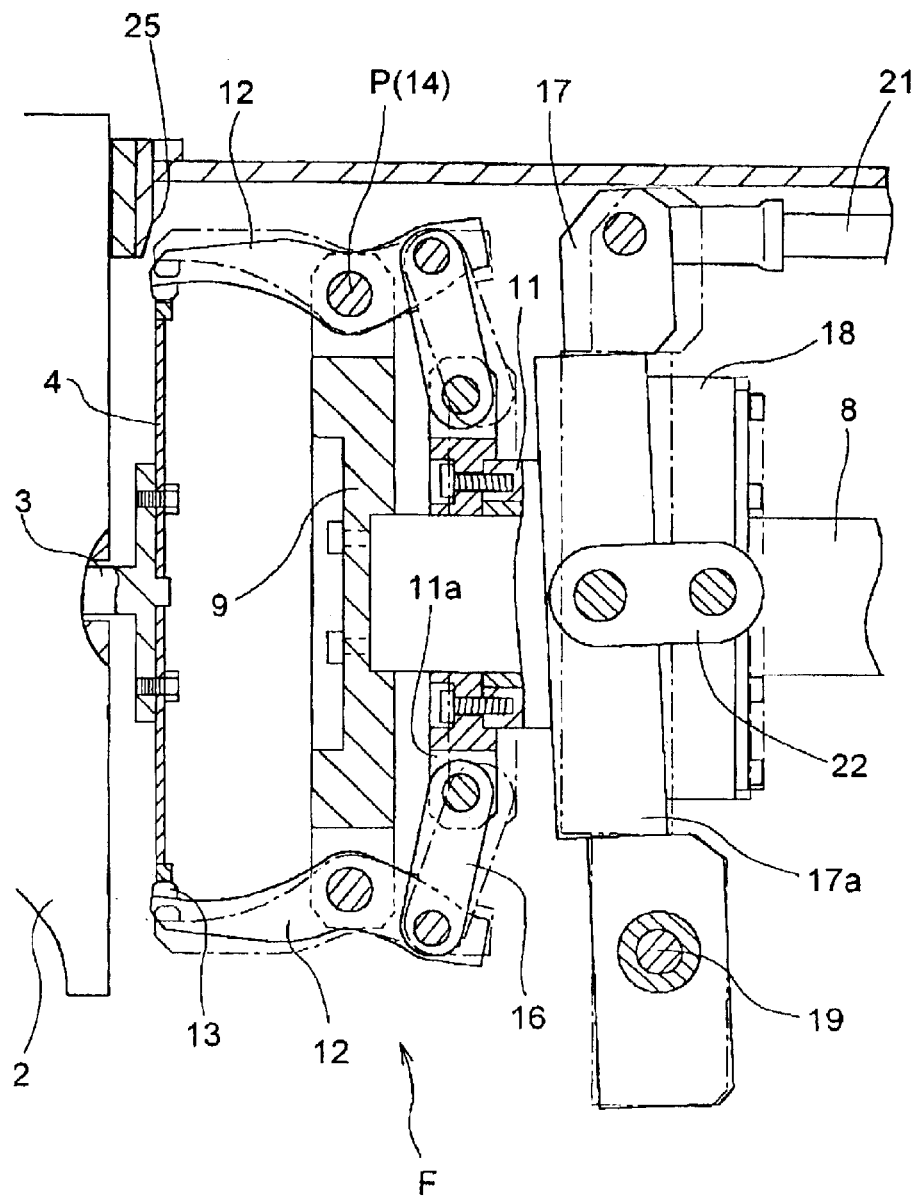
FIG. 6 is a lateral view showing a state in which the engaging member is engaged with the ring gear.
Figure 7:
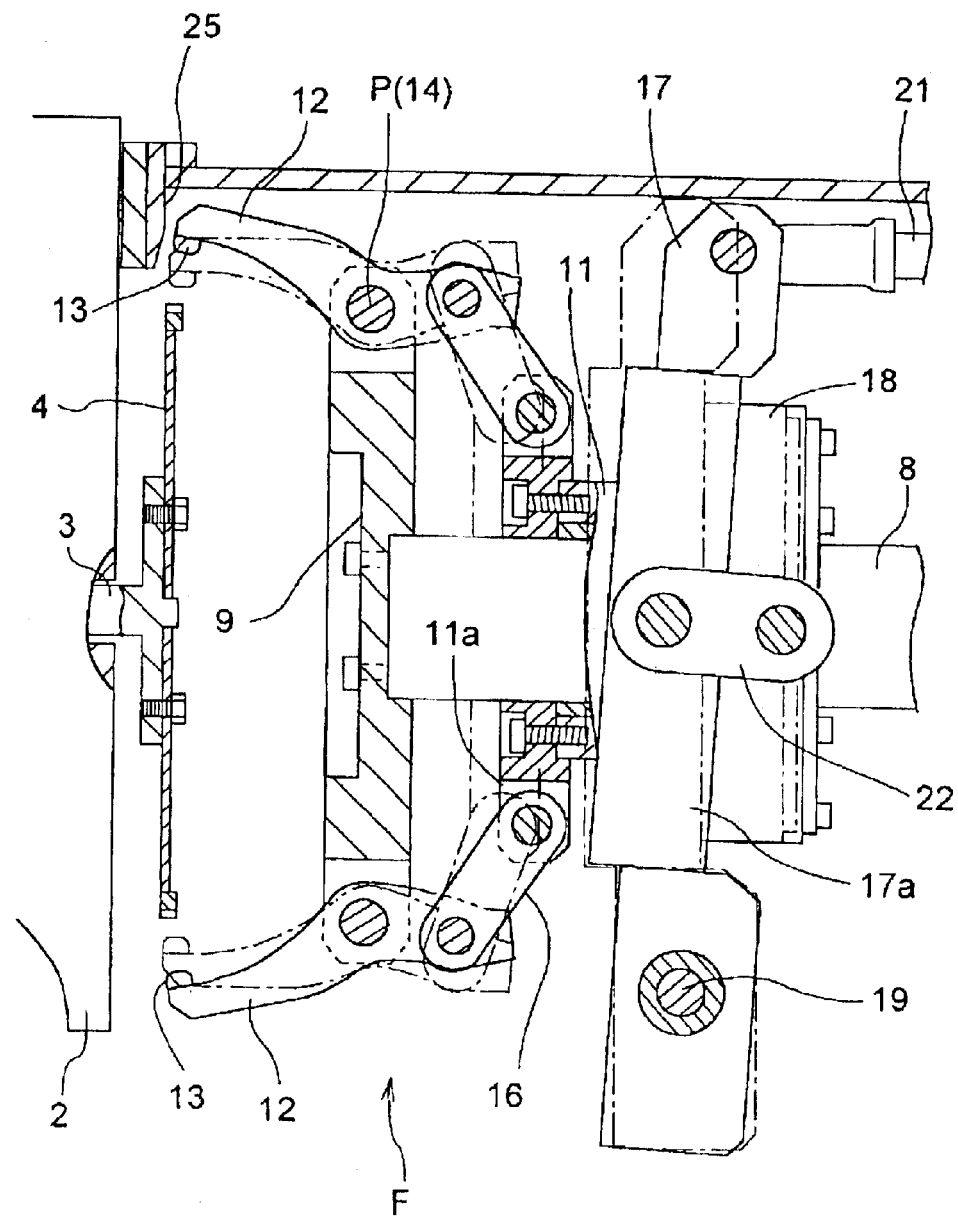
FIG. 7 is a lateral view showing a state in which the engaging member is disengaged from the ring gear.
Figure 8:
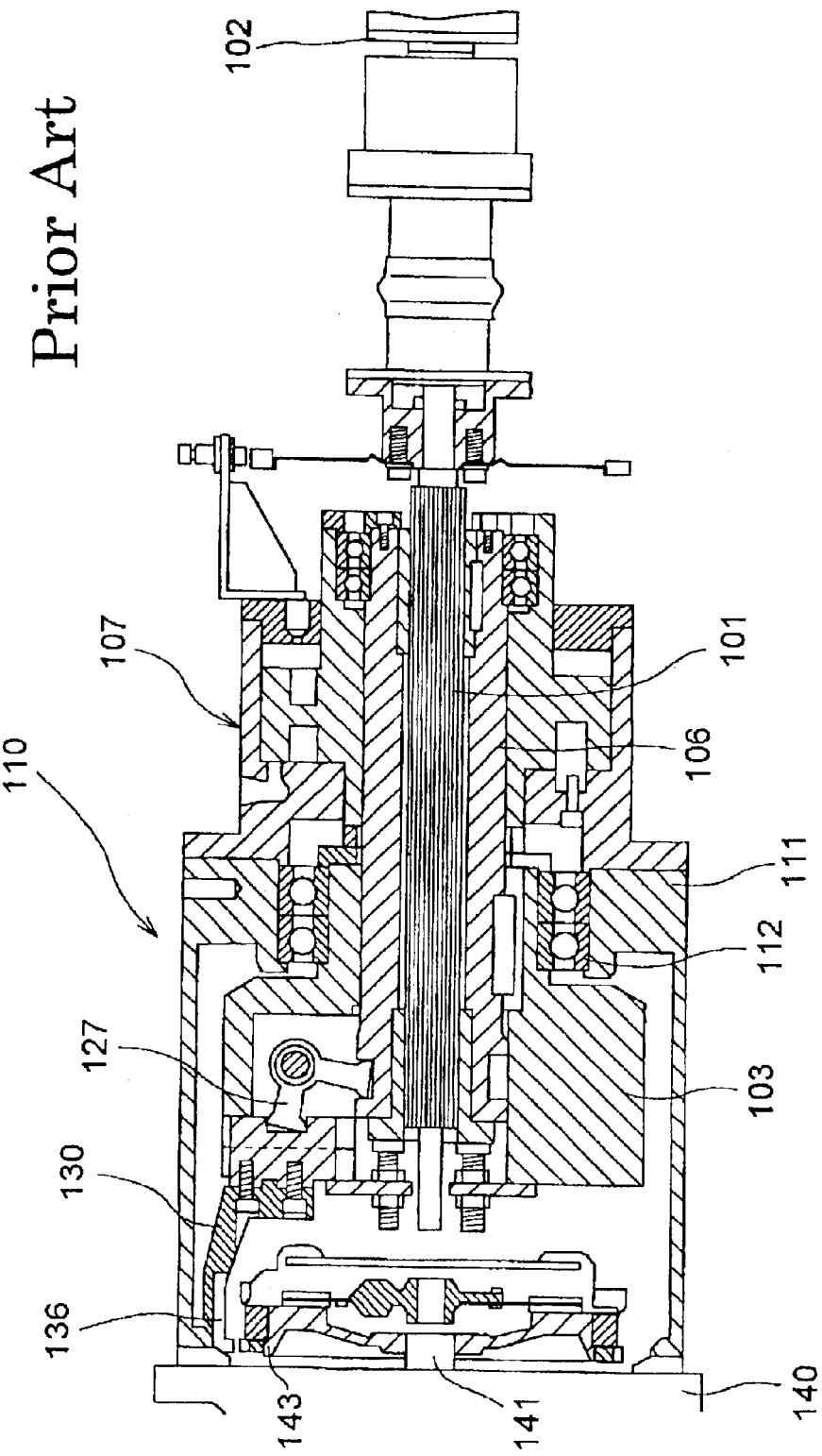
FIG. 8 is a vertical cross-sectional lateral view schematically showing the rotational driving apparatus according to the first conventional example.
Figure 9:
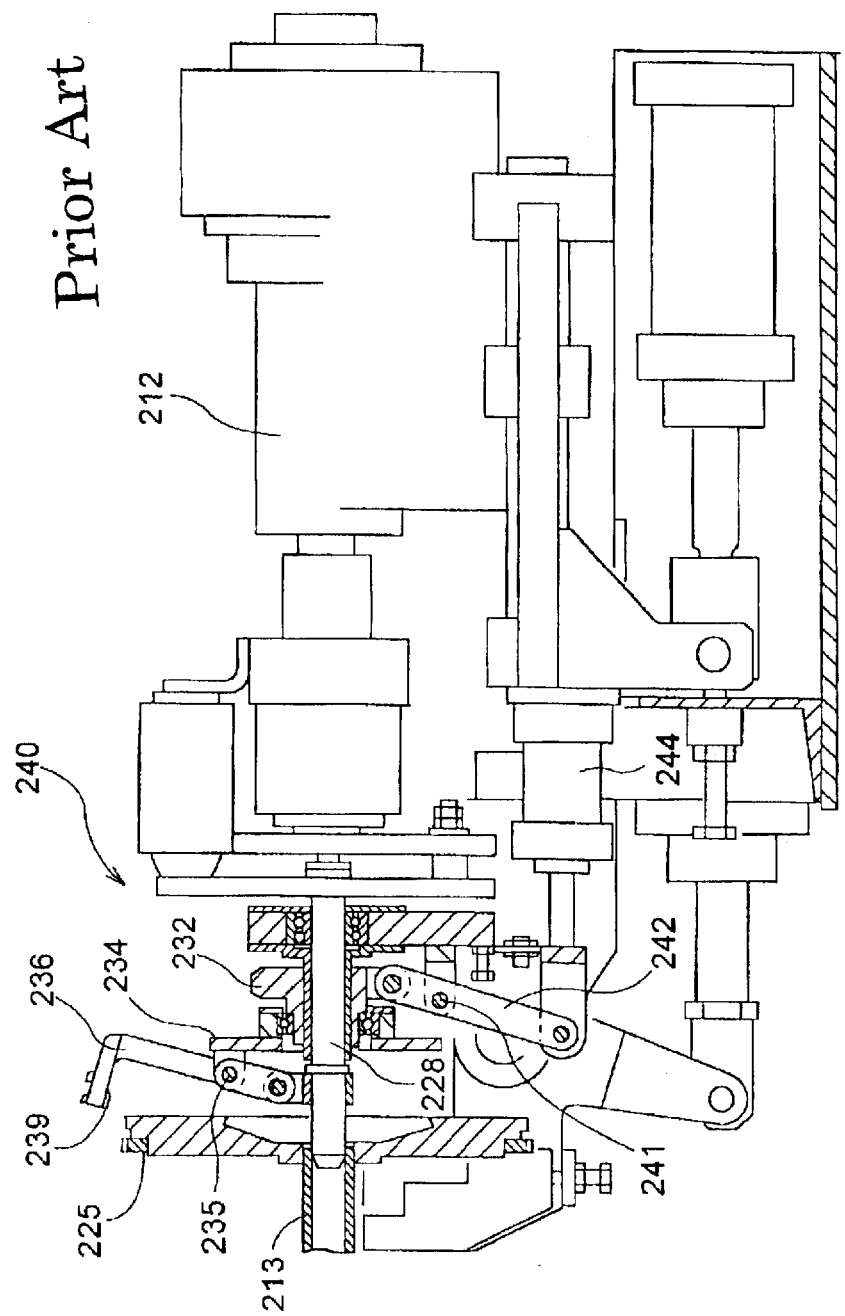
FIG. 9 is a vertical cross-sectional lateral view schematically showing the rotational driving apparatus according to the second conventional example.

The pivot bracket 17 is provided with a cylindrical portion 17a that is separate from the linking cylinder 18 and that encloses the outer circumference of the cylinder 18 and can pivot about the transverse shaft 19 as it surrounds the linking cylinder 18 (see FIGS. 6 and 7). The cylindrical portion 17a of the pivot bracket 17 and the linking cylinder 18 are linked by a connector link 22 so that they move together in the rotation axis X direction (that is, in the rotation axis direction of the output shaft 8).

An actuator 21 is mounted between the tip portion of the pivot bracket 17 and the support frame 20. For the actuator 21 it is possible to use a hydraulic cylinder, a gas-pressure cylinder, or an electric motor, for example. The actuator 21 may be operated manually or automatically controlled by electric signals.

Consequently, with the shifting mechanism F, when the actuator 21 pivots the pivot bracket 17, the pivot bracket 17 causes the reciprocating member 11 to shift back and forth in the rotation axis X direction and switch the pivot arms 12 between the engaged position and the released position.

When the ring gear 4, that is, the internal combustion engine 2, is rotatively driven with the pivot arms 12 switched to the engaged position, the centrifugal force leads to a torque in the direction in which the engaging portion is caused to engage the ring gear due a portion between the support position and the rear end of the pivot portion. This torque cancels out at least a portion of a torque generated by the portion on the front end side of the pivot portion. Because the torque with respect to the fulcrum P is better-balanced in the pivot arms 12 and the link members 16 are arranged such that a large angle is formed between them and the rotation axis X, a large force is not applied to the reciprocating member 11 in the direction in which it is shifted, even if the ring gear 4 is rotated at high speeds, when the pivot arms 12 are held in the engaged position in which they engage the ring gear 4. In other words, only a relatively small force is required to hold the reciprocating member 11 in the position that corresponds to the engaged position of the pivot arms 12.

It should be noted that the member 24 shown in FIG. 1 is a cover that covers the exterior of the pivot arms 12 and the rotor 9, for example, and is supported by the support frame 20. Also, a semi-circular arc member 25 provided with an engine-positioning portion is provided at the front end portion of the cover member 24.

Other Embodiments

Other embodiments are described below.

In the above preferred embodiment, the first portion 12a of the pivot arms 12 was made slightly lighter than the second portion 12b so that the centrifugal force created during rotative driving would predispose the engaging portion 13 to shift in the direction in which it engages the ring gear 4. Instead of this, it is also possible to bring the center of gravity of the first portion 12a closer to the fulcrum P than the center of gravity of the second portion 12b so as to predispose the engaging portion 13 to move in the direction in which it engages the ring gear 4 at the time of rotation. Alternatively, the distance from the first portion 12a to the rotation axis X can be made shorter than the distance from the second portion 12b to the rotation axis X. Of course, the torque that is respectively applied to the first portion 12a and the second portion 12b of the pivot arms 12 also can be adjusted by adjusting the combination of these variables.

In the preceding embodiment, an example was shown in which the output shaft is rotatively driven by an electric motor, however, it is also possible to rotatively drive the output shaft using a different driving apparatus, such as a hydraulic motor.

In the preceding embodiment, an example was shown in which the torque balance with respect to the pivot fulcrum of the pivot arms 12 was set so that the torque from the side with the engaging member is less than the torque from the opposite side, however, the pivot arms 12 can also be configured so that the torque balance about a fulcrum at an intermediate portion is substantially the same on both sides of the pivot fulcrum. In this case, "substantially the same" means that the value of the difference between the torque of the first portion 12a and the torque of the second portion 12b of the pivot arms 12 divided by the torque of the first portion 12a is not more than 0.05.

It should be noted that although the torque of the first portion 12a can conceivably be made larger than the torque of the second portion 12b of the pivot arms 12, the centrifugal force will predispose the pivot arms 12 to pivot away from the ring gear, and thus for practical purposes this is not desirable when the torque from the first portion 12a is much greater than the second portion 12b.

In the above embodiment, an example was shown in which three pivot arms 12 were provided with equal spacing between them in the circumferential direction, however, it is also possible to provide two or four or more pivot arms, and various changes can be made to the number of pivot arms 12 that are provided and their arrangement in the circumferential direction.

Moreover, in the above embodiment, only one actuator was provided, however, it is also possible to provide more than one actuator so as to shift the pivot bracket 17 parallel to the direction of the rotation axis.

Also, a configuration in which the angle of the link portions 16 with respect to the rotation axis X is not made large because superior balance of the pivot portion can be achieved by only the torque that is generated by second portion 12b is also included within the scope of the present invention. Consequently, in this case, an end portion of the link members 16 could conceivably be pivoted on the rotor.

What is claimed is:

1. A rotational driving apparatus for testing an internal combustion engine to which a ring gear is attached, comprising:
   a rotor that is rotatively driven about a rotation axis of the ring gear;
   a pivot portion supported to the rotor such that it can pivot about a fulcrum, wherein the fulcrum is arranged at a position substantially away from a front end and a rear end of the pivot portion in the direction of the rotation axis of the ring gear;
   an engaging portion that is positioned at one end region of the pivot portion and that is capable of engaging the ring gear by shifting inward with respect to a radial direction of the ring gear in response to the pivot portion pivoting about the fulcrum;
   a reciprocating member that can be moved back and forth along the direction of the rotation axis of the ring gear;
   a link member, one end of which is pivoted at a rear end or a position more frontward than the rear end of the pivot portion and the other end of which is pivoted with respect to the reciprocating member; and
   an actuator that is operatively connected to the reciprocating member and that shifts the reciprocating member along the direction of the rotation axis of the ring gear.

2. The rotational driving apparatus according to claim 1, wherein the pivot portion extends generally parallel to the rotation axis of the ring gear.

3. The rotational driving apparatus according to claim 1, wherein a minimum angle of the link member with respect to the rotation axis of the ring gear is 45°.

4. The rotational driving apparatus according to claim 1, wherein the reciprocating member is supported by a rotation shaft that is coaxial with the rotation axis of the ring gear.

5. The rotational driving apparatus according to claim 1, wherein the weight of a portion of the pivot portion that is on an engaging portion side of the fulcrum is the same or smaller than the weight of a portion of the pivot portion on the opposite side of the fulcrum.

6. The rotational driving apparatus according to claim 1, wherein the rotor is rotatively driven by an electric motor.

7. A rotational driving apparatus for testing an internal combustion engine to which a ring gear is attached, comprising:
   a rotation shaft that is coaxial with a rotation axis of the ring gear;
   a rotor that can rotate as a single unit with the rotation shaft and that has a portion extending in a radial direction with respect to the rotation shaft;
   a pivot portion supported by the rotor at a support position that is substantially away from the pivot portion's front end and rear end in the axial direction of the rotation shaft, the pivot portion having an engaging portion in a region of its front end that is engageable with the ring gear, wherein, when the rotor is rotated, a torque in a direction in which the engaging portion is caused to engage the ring gear is generated by a portion of the pivot portion between the support position and the rear end;
   a pivot shaft that is provided either on the rotor or the pivot portion and that has an axis in a direction perpendicular to the direction of the axis of the rotation shaft, the pivot portion being pivotable about the pivot shaft;
   a reciprocating member that can be shifted back and forth in the direction of the axis of the rotation shaft;
   a link that is pivotably linked to either the rotor or the pivot portion and that is pivotably linked to the reciprocating member; and
   an actuator for shifting the reciprocating member along the direction of the axis of the rotation shaft.

8. The rotational driving apparatus according to claim 7, wherein the pivot portion extends generally parallel to the direction of the axis of the rotation shaft.

9. The rotational driving apparatus according to claim 7, wherein the link is linked to the pivot portion at a position between the rear end and the support position.

10. The rotational driving apparatus according to claim 7, wherein a maximum angle of the link with respect to the axis of the rotation shaft is not more than 90°.

11. The rotational driving apparatus according to claim 10, wherein the maximum angle is not less than 70°.

12. The rotational driving apparatus according to claim 11, wherein the maximum angle is not less than 80°.

13. The rotational driving apparatus according to claim 7, wherein a minimum angle of the link with respect to the axis of the rotation shaft is not less than 45°.

14. The rotational driving apparatus according to claim 13, wherein the minimum angle is not less than 50°.

15. The rotational driving apparatus according to claim 7, wherein the pivot portion has a first portion between the front end and the support position and a second portion between the rear and the support position, and a torque of the first portion with respect to the support position due to centrifugal force generated when the rotor is rotated is less than a torque of the second portion with respect to the support position.

16. The rotational driving apparatus according to claim 15, wherein when a difference between the torque of the first portion with respect to the support position and the torque of the second portion with respect to the support position is divided by the torque of the first portion with respect to the support position, the resulting value is not more than 0.7.

* * * * *